United States Patent
Roger et al.

(10) Patent No.: US 12,155,434 B2
(45) Date of Patent: Nov. 26, 2024

(54) RADAR SYSTEM AND METHOD OF HANDLING RADAR SIGNALS OF A RADAR SYSTEM

(71) Applicant: Infineon Technologies AG, Neubiberg (DE)

(72) Inventors: Andre Roger, Munich (DE); Markus Bichl, Feldkirchen-Westerham (DE); Farhan Bin Khalid, Munich (DE); Dian Tresna Nugraha, Bandung (ID); Romain Ygnace, Brunnthal (DE)

(73) Assignee: Infineon Technologies AG, Neubiberg (DE)

( * ) Notice: Subject to any disclaimer, the term of this patent is extended or adjusted under 35 U.S.C. 154(b) by 486 days.

(21) Appl. No.: 17/481,517

(22) Filed: Sep. 22, 2021

(65) Prior Publication Data

US 2022/0103218 A1     Mar. 31, 2022

(30) Foreign Application Priority Data

Sep. 25, 2020 (DE) ...................... 10 2020 125 110.6

(51) Int. Cl.
*H04B 7/06* (2006.01)
*G01S 7/288* (2006.01)
(Continued)

(52) U.S. Cl.
CPC .......... *H04B 7/0617* (2013.01); *G01S 7/2883* (2021.05); *G01S 13/424* (2013.01);
(Continued)

(58) Field of Classification Search
CPC ...... H04B 7/0617; H04B 7/0686; H04B 7/02;
G01S 7/2883; G01S 13/424; G01S 13/08;
G01S 13/46; G01S 13/931; G01S 13/42;
G01S 7/02; G01S 13/06; G01S 13/003;
G01S 13/02; G01S 3/00; G01S 13/88
(Continued)

(56) References Cited

U.S. PATENT DOCUMENTS 5,751,240 A     5/1998  Fujita et al.
6,071,240 A *   6/2000  Hall ..................... G01S 7/52046
                                                         600/443
(Continued)

OTHER PUBLICATIONS

Wikipedia; "Sample and hold"; Web Article; https://en.wikipedia.org/wiki/Sample_and_hold ; Aug. 10, 2020.

*Primary Examiner* — Vladimir Magloire
*Assistant Examiner* — Remash R Guyah
(74) *Attorney, Agent, or Firm* — Eschweiler & Potashnik, LLC

(57) ABSTRACT

A method for a radar system having a plurality of antennas is provided. The method includes processing a plurality of radar signals for determining a distance between the radar system and at least one target and a velocity of the at least one target, thereby forming a plurality of processed radar signals. Each radar signal of the plurality of radar signals is received by an associated antenna of the plurality of antennas. The plurality of processed radar signals are digitally beamformed for at least one beam direction, thereby forming a plurality of beamformed radar signals. The plurality of beamformed radar signals are summed from the plurality of antennas per beam direction.

18 Claims, 7 Drawing Sheets

(51) Int. Cl.
  *G01S 13/08*  (2006.01)
  *G01S 13/42*  (2006.01)
  *G01S 13/46*  (2006.01)
  *G01S 13/931* (2020.01)

(52) U.S. Cl.
  CPC ............... *G01S 13/08* (2013.01); *G01S 13/46* (2013.01); *G01S 13/931* (2013.01)

(58) Field of Classification Search
  USPC ........................................................ 342/118
  See application file for complete search history.

(56) References Cited

U.S. PATENT DOCUMENTS

| | | | |
|---|---|---|---|
| 2017/0131392 A1 | 5/2017 | Schoor | |
| 2019/0237871 A1* | 8/2019 | Berg | G01S 7/352 |
| 2019/0331765 A1* | 10/2019 | Rao | G01S 13/34 |
| 2019/0391251 A1* | 12/2019 | Bharadwaj, Jr. | G01S 13/584 |
| 2020/0150260 A1 | 5/2020 | Lang et al. | |

* cited by examiner $$DBF_b(n) = \sum_{m=0}^{M-1} a_{(b,m)} \cdot DFT_N\big(w(k) \cdot x_m(k)\big)$$

RADAR SYSTEM AND METHOD OF HANDLING RADAR SIGNALS OF A RADAR SYSTEM

REFERENCE TO RELATED APPLICATION

This application claims priority to German Application No. 10 2020 125 110.6, filed on Sep. 25, 2020, the contents of which are hereby incorporated by reference in their entirety.

TECHNICAL FIELD

Various embodiments relate generally to a method of handling radar signals of a radar system and to a radar system.

BACKGROUND

A method of radar signal processing may include beamforming a radar signal. Several beamforming methods are available, one of which is digital beamforming.

To beamform a radar signal, a portion of the signal coming from a specific direction may be digitally amplified. This may require two operations. In a first operation, the signal may be steered in a given direction, and in a second operation, the signal may be amplified Generating the beam formed signal may require two passes through a signal processing unit, wherein the first pass may perform the beam is steering, and another pass may process the signal with the beam left unsteered.

This procedure, in particular the double pass, may be time consuming and sub-optimal.

SUMMARY

A method of handling radar signals of a radar system having a plurality of antennas is provided. The method may include processing a plurality of radar signals for determining a distance between the radar system and at least one target and a velocity of the at least one target, thereby forming a plurality of processed radar signals, wherein each radar signal of the plurality of radar signals is received by an associated antenna of the plurality of antennas. The method may include digitally beamforming the plurality of processed radar signals for at least one beam direction, thereby forming a plurality of beamformed radar signals. The method may include summing the plurality of beamformed radar signals from the plurality of antennas per beam direction.

BRIEF DESCRIPTION OF THE DRAWINGS

In the drawings, like reference characters generally refer to the same parts throughout the different views. The drawings are not necessarily to scale, emphasis instead generally being placed upon illustrating the embodiments of the disclosure. In the following description, various embodiments are described with reference to the following drawings, in which.

DETAILED DESCRIPTION

The following detailed description refers to the accompanying drawings that show, by way of illustration, specific details and embodiments. may The word "exemplary" is used herein to mean "serving as an example, instance, or illustration". Any embodiment or design described herein as "exemplary" is not necessarily to be construed as preferred or advantageous over other embodiments or designs.

Various aspects of the disclosure are provided for devices, and various aspects of the disclosure are provided for methods. It will be understood that basic properties of the devices also hold for the methods and vice versa. Therefore, for sake of brevity, duplicate description of such properties may have been omitted.

Figure 1A:
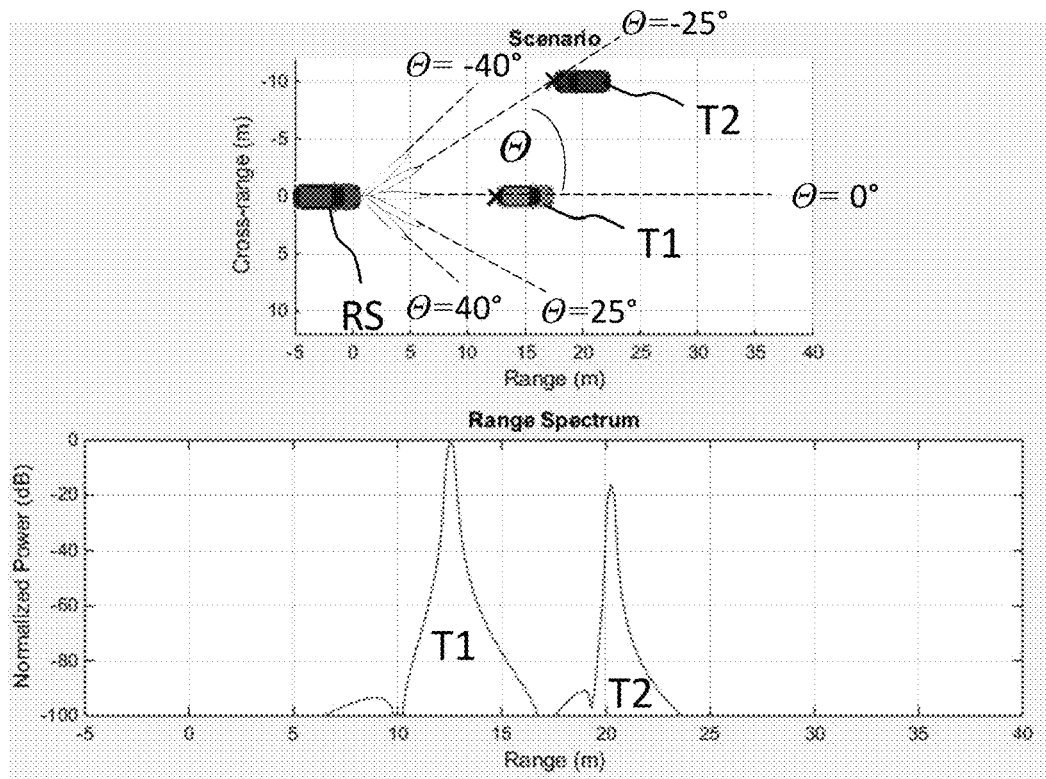
FIG. 1A shows an exemplary arrangement of cars for illustrating how radar signals are processed, and the processed radar signals.
Figure 1B:
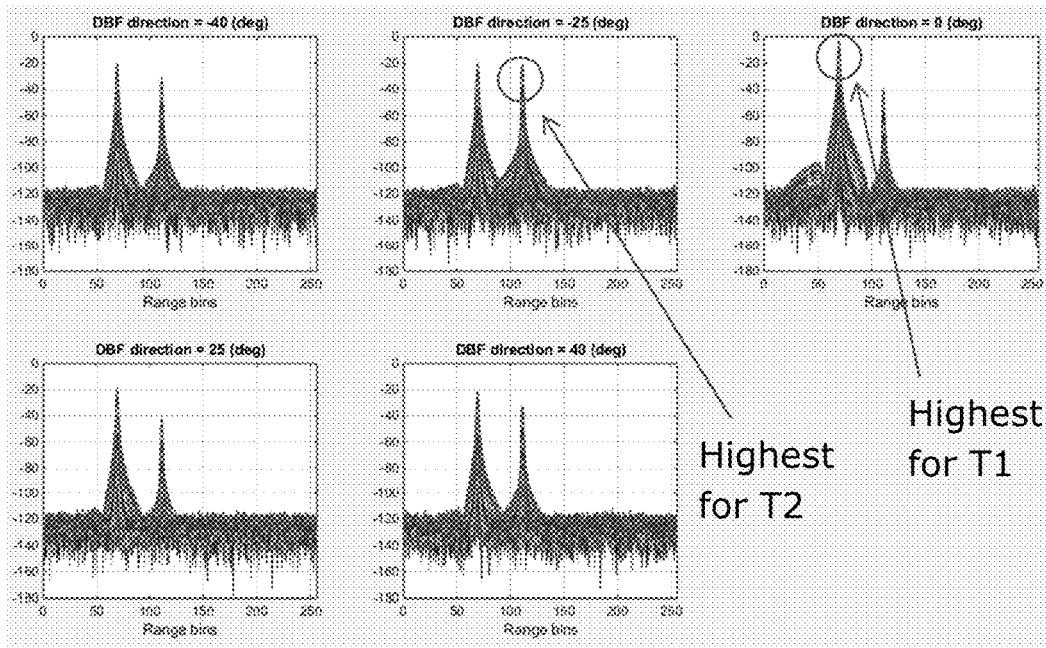
FIG. 1B shows beam-steered radar signals.
Figure 1C:
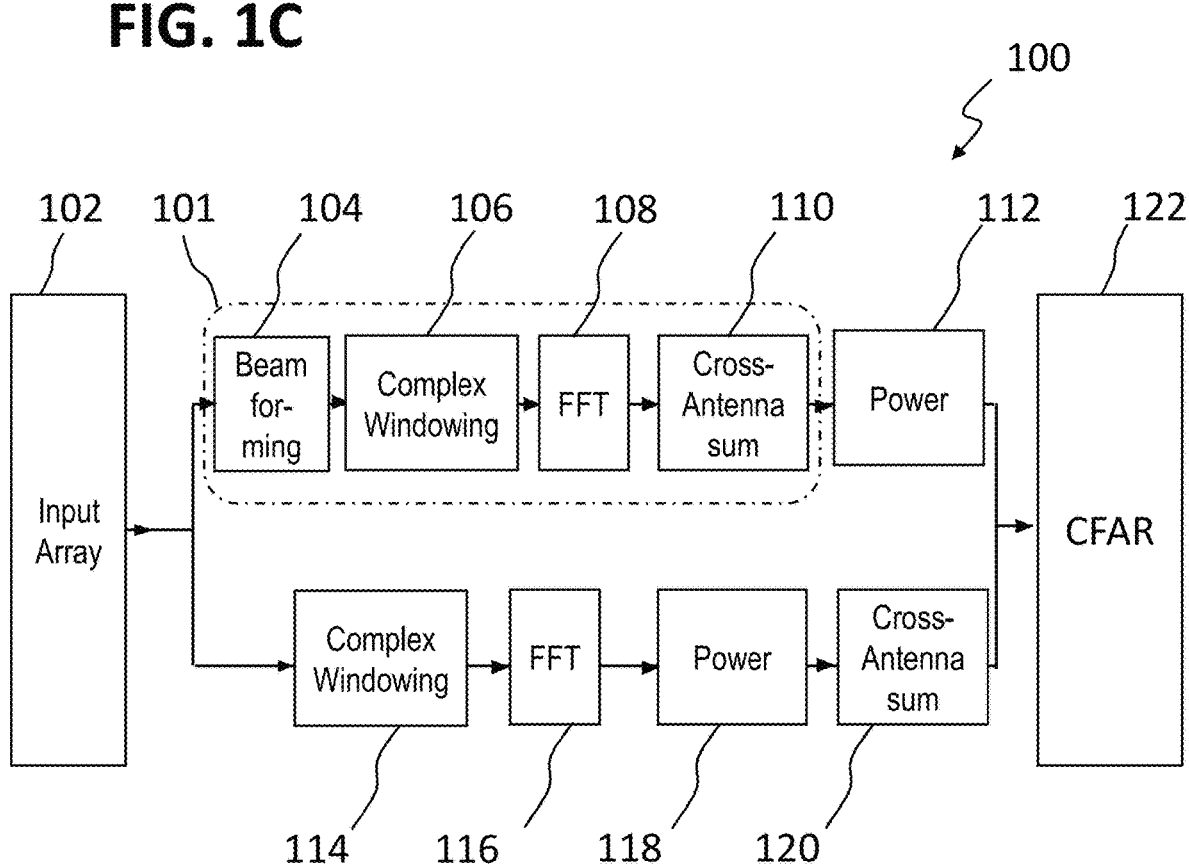
FIG. 1C schematically shows a portion of a radar system.

FIG. 1A shows, in a top panel, an exemplary arrangement of targets T1 and T2 (cars in this case) to be detected by a radar system operated in an object (e.g., another car) labelled with RS for illustrating how radar signals of the radar system may be processed, e.g. in a portion 100 of the radar system as shown in FIG. 1C, and in a bottom panel the processed radar signals for the first target T1 and for the second target T2 as normalized power versus range (wherein range is a distance between the radar system and the respective target). The radar signals shown in FIG. 1A may be unsteered, which may be similar or identical to a beam steered radar signal for an angle of 0° (in other words, straight ahead of the object RS).

FIG. 1B shows beam-steered radar signals, for example, for five different beam steering angles: −40°, −25°, 0°, 25°, and 40°. These five angles are also illustrated in FIG. 1A. Although five different beam steering angles are illustrated for example, the number of beam angles can be more or less than five. As can be seen in the beam-steered radar signals, both targets T1, T2 are detected in all the beam-steered signals, but relative signal strengths for the two targets T1, T2 may vary. While for most beam steering angles, a normalized power of the radar signal reflected from the first target T1, which is the closer of the two targets T1, T2, may be higher than for T2 and may have its highest absolute value for the beam steering angle corresponding to the angle of 0° between the radar system RS and the target T1. For the beam steering angle of −25°, which corresponds to the direction towards the second target T2, the signal strength of the second target T2 reaches its highest value, which is approximately as high as for the first target T1. This may allow determining directions towards the first target T1 and the second target T2.

Visually speaking, the digital beam steering may include combining the radar signals received in a plurality of receivers in such a way that a relative phase delay that would be caused in the plurality of receivers by a target that would be located in a direction of a desired steering angle is taken into account.

FIG. 1C schematically shows a portion 100 of the radar system, which may be configured to apply a digital beam steering.

The radar system may be configured to coherently integrate radar signals from a plurality of antennas provided by an input array 102. The coherent integration is shown in the upper branch and may include beamforming 104, complex windowing 106, (fast) fourier transformation 108, a coherent summing 110 of the beamformed, windowed and fourier transformed signals from the plurality of antennas (also referred to as cross-antenna sum), and a subsequent amplitude detection 112 (labelled as "power").

The radar system may further be configured to non-coherently integrate the radar signals from a plurality of antennas provided by the input array 102. The non-coherent integration is shown in the lower branch and may include complex windowing 114, (fast) fourier transformation 116, an amplitude detection 118 (labelled as "power"; since this is applied before the summing, the phase information is lost, causing the sum to be non-coherent), and a non-coherent summing 120 of the absolute values of the windowed and fourier transformed signals from the plurality of antennas (also referred to as cross-antenna sum).

The coherent sum and the non-coherent sum may be passed on to a detection block 122 for target detection, for example a detection block 122 configured to determine a constant false alarm rate (CFAR) of the processed signal and if and where the processed signal is above the constant false alarm rate.

The above described beam forming may require two passes in a signal processing unit, one where the beam is steered (the coherent integration in the upper branch), and another where the beam is left unsteered (the non-coherent integration in the lower branch).

Figure 1D:
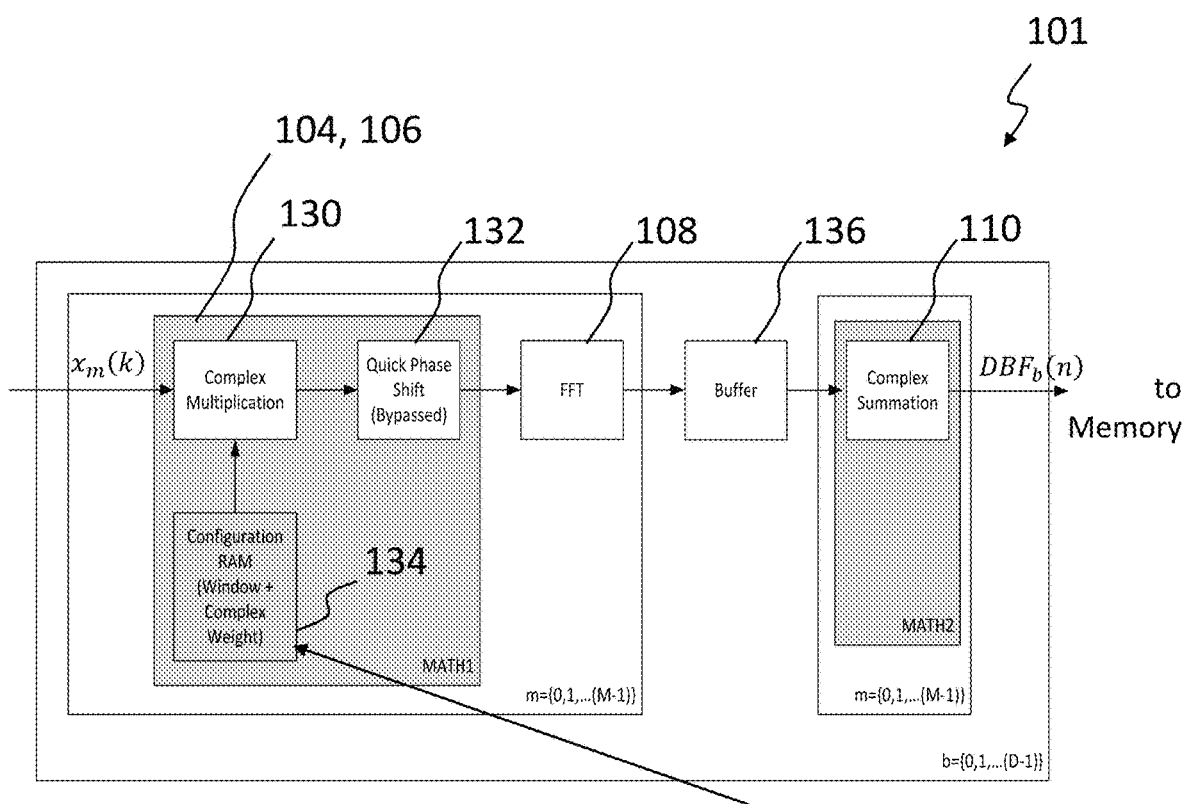
FIG. 1D schematically illustrates a portion of a radar system.

FIG. 1D schematically shows more details of a portion 101 of the portion 100 of the radar system of FIG. 1C. In particular, it shows how the beam forming 104 and the complex windowing 106 may be performed and provides a formula for a computation of the digital beamformed fourier transform for a given beam steering direction (specified as beam index b) $DBF_b(n)$. Descriptions of the variables/notations in the formula are provided in table 1 below.

Specifically, in a first mathematical operation (MATH1), a single complex multiplier 134 may be provided that includes both a windowing coefficient w(k) that may be different for different samples, but the same for different beam steering angles and different antennas, and a weighting coefficient, also referred to as antenna factor $a_{(b,m)}$, which may differ for different beam directions b and for different antennas m, but may be the same for different samples. The multiplier 134 may thus be described as "multiplied antenna factor with windowing" ($a_{(b,m)} \cdot w(k)$). The multiplier 134 may be stored in memory, for example in a configuration RAM. In some embodiments, the first mathematical operation (MATH1) may also include a complex multiplication block 130 (230 in FIG. 2B) and a quick phase shift block 132 (232 in FIG. 2B). In some embodiments, a buffer 136 is arranged between the (fast) fourier transformation 108 and the coherent summing 110.

For each desired beam steering direction with the beam index b this can include storing M*K (for M antennas and K samples per antenna). Thus a large memory could be required. For example for M=8, K=1024, complex 32-bit=>64 KiB of configuration RAM size can be required, which could exceed a size of a typical configuration RAM.

Furthermore, the M*K elements may be updated, e.g. by a CPU, in between successive loops targeting the different beam directions (different beam indices b), which may cause a high update latency.

In various embodiments, a radar system and a method of handling radar signals from a radar system are provided that support using a complex multiplication factor per antenna for a coherent integration and for a non-coherent integration of the radar signal, respectively.

In various embodiments, a fixed digital beam forming (DBF) coefficient per antenna may be provided to enable per antenna beam steering.

In various embodiments, a finer beam forming, for example a per sample beam steering, may be enabled by providing a vector coefficient.

In various embodiments, the windowing coefficient w(k) and the antenna factor $a_{(b,m)}$ may be decoupled. This may allow to perform the beam steering after the fourier transform, in other words to enable post FFT beam steering, which means that the beam steering may be executed in parallel. In an exemplary embodiment, this may allow saving up to 500 μs (out of 2.5 ms) per processing step.

Figure 2A:
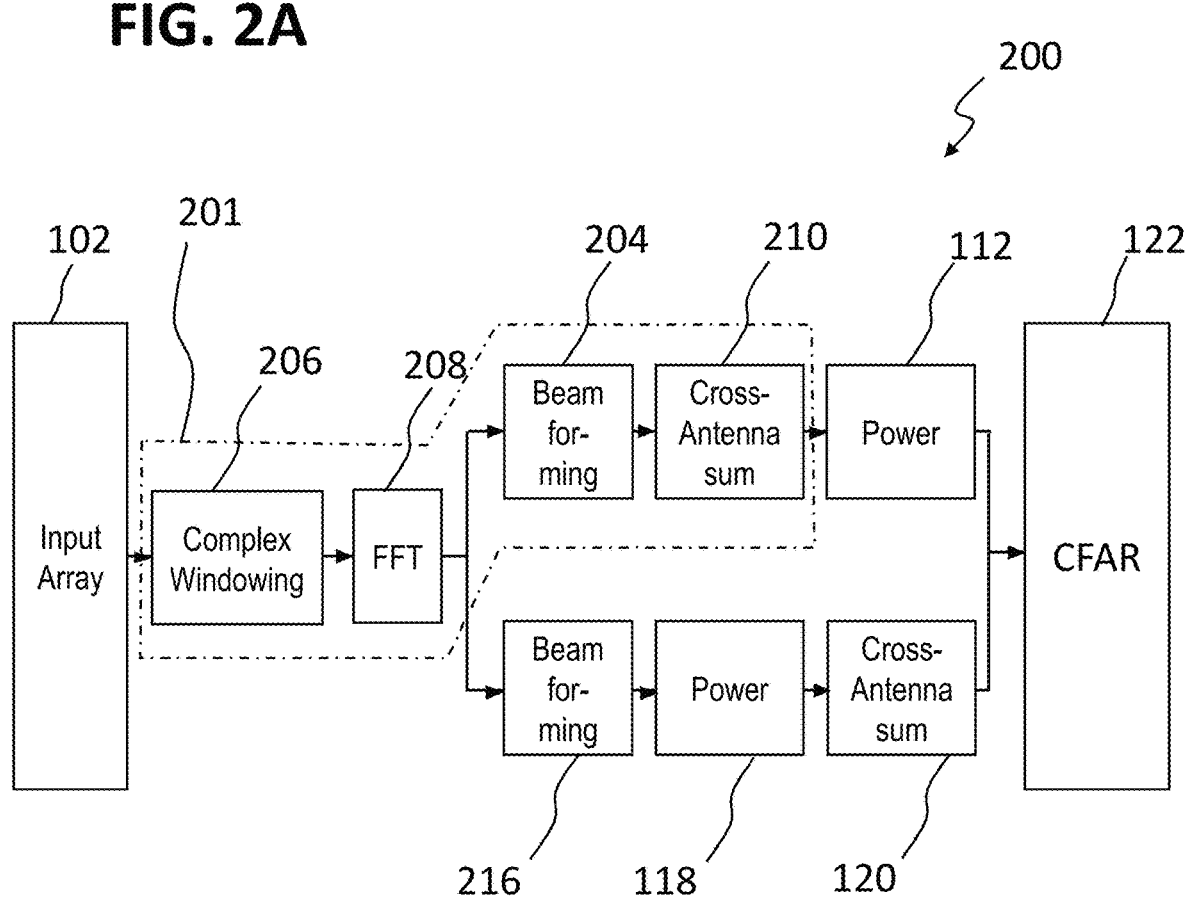
FIG. 2A schematically illustrates a portion of a radar system in accordance with various embodiments.
Figure 2B:
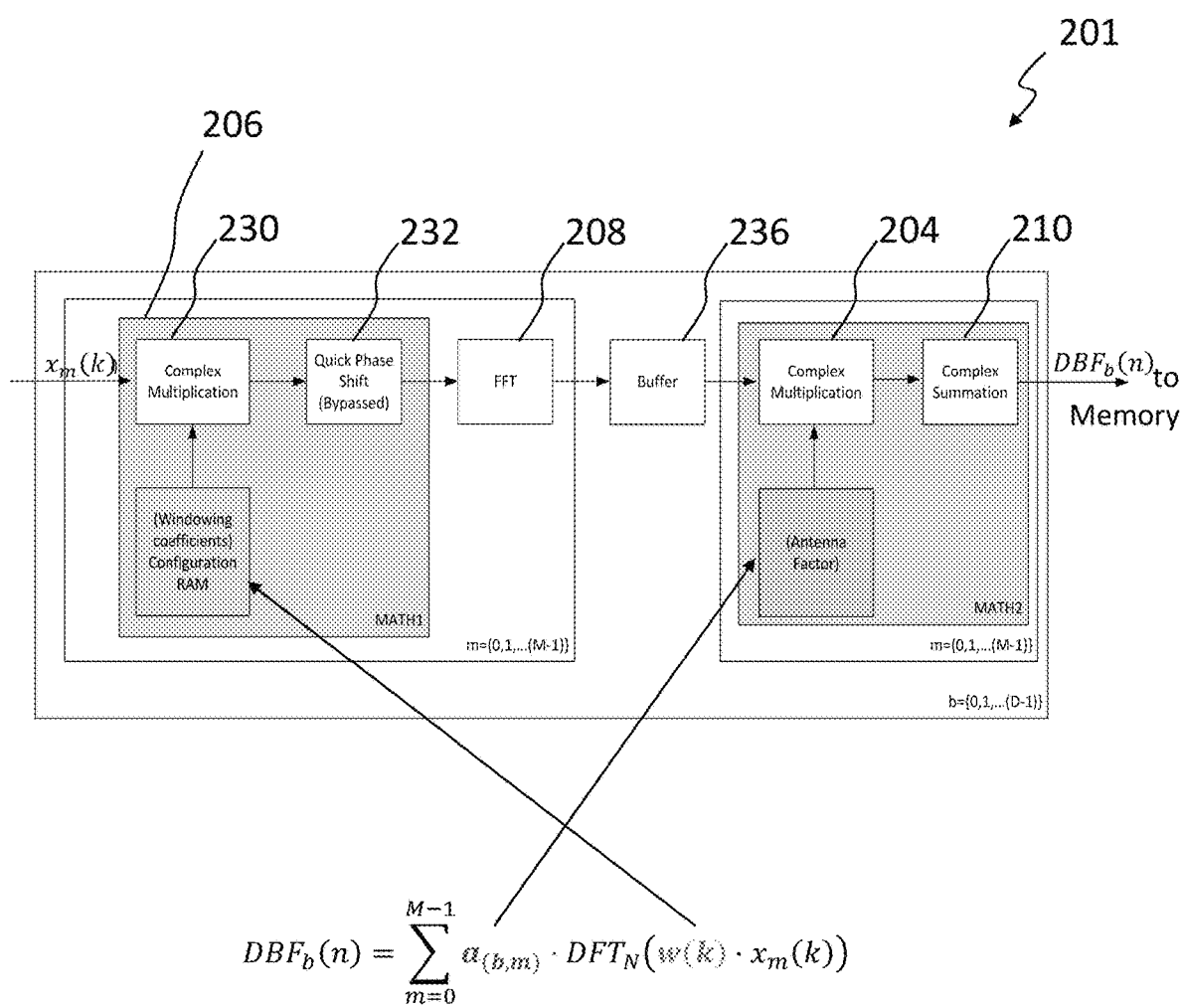
FIG. 2B schematically illustrates a portion of a radar system in accordance with various embodiments.
Figure 3:
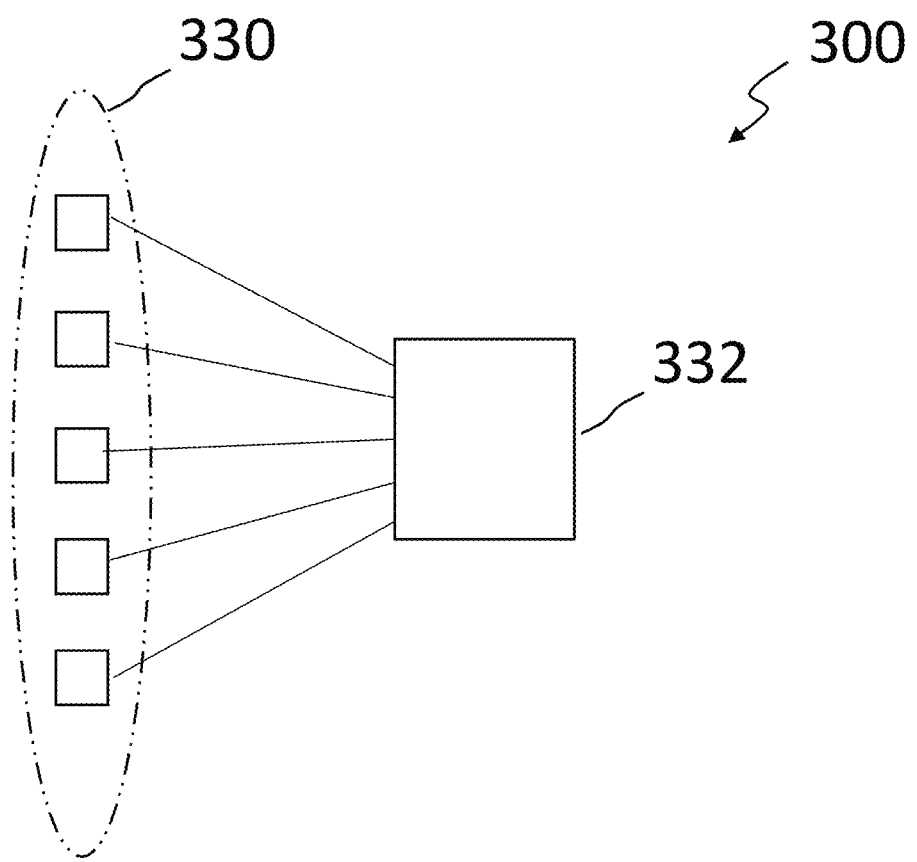
FIG. 3 schematically illustrates a radar system in accordance with various embodiments.

FIG. 3 schematically shows a radar system 300 in accordance with various embodiments, FIG. 2A schematically shows a portion 200 of a radar system in accordance with various embodiments, for example of the radar system 300 of FIG. 3, and FIG. 2B schematically shows a portion 201 of the portion 200 of the radar system of FIG. 2A.

The following table describes notations as used in the formulas provided in FIG. 1D, FIG. 2B and elsewhere in this document.

TABLE 1

The following table describes notations as used in the formulas provided in FIG. 1D, FIG. 2B and elsewhere in this document.

| NOTATION/FORMULA | DESCRIPTION |
| --- | --- |
| M | Number of antenna |
| m = {0, 1, . . . , (M − 1)} | Antenna index |
| K | Number of samples per antenna |
| k = {0, 1, . . . , (K − 1)} | Sample index (time-domain) |
| $x_m(k)$ | Samples of antenna-m |
| w(k) | Window function |
| $X_m(n) = DFT_N(w(k) \cdot x_m(k))$ | N-point discrete Fourier transform (DFT) of antenna-m n = frequency domain sample index = {0, 1 . . . , (N − 1)} |
| D | Number of beamforming directions |
| b = {0, 1, . . . , (D − 1)} | Beam index |
| $a_{b,m}$ | Antenna factor, complex valued. |
| $DBF_b(n) = \sum_{m=0}^{M-1} a_{b,m} \cdot X(n)$ | Digital beamforming Example formula for computing Coefficient: $a_{b,m} = \exp(2\pi j(m \cdot d) \cdot \sin(\theta_b))$ $\theta_b$: beam direction (in radian) d: antenna spacing (in wavelength) |
| $DBF_b(n) = \sum_{m=0}^{M-1} a_{b,m} \cdot DFT_N(w(k) \cdot x_m(k))$ | |

The radar system 300 may include a plurality of antennas 330 (for example M antennas addressed as m=0, . . . M−1), and at least one processor 332 configured to process a plurality of radar signals $x_m(k)$ for determining a distance between the radar system 300 and at least one target and a velocity of the at least one target. For visualizing the general working principle, geometry, etc. FIG. 1A may be considered here, too.

In various embodiments, a plurality of processed radar signals $DFT_N$ may be formed thereby, wherein each radar signal of the plurality of radar signals may be received by an associated antenna of the plurality of antennas 330. In other words, one radar signal per antenna 330 may be generated. In various embodiments, a plurality of samples (e.g. K samples addressed as k=0, ... K−1) per antenna 330 may be generated.

The processor 332 may further be configured to digitally beamform (see for example 204 in FIGS. 2A and 2B) the plurality of processed radar signals $DFT_N$ for at least one beam direction b, optionally for a plurality of beam directions, for example D beam directions addressed as b=0, ... D−1) thereby forming a plurality of beamformed radar signals, and to sum the plurality of beamformed radar signals from the plurality of antennas 330 per beam direction b (see for example 210 in FIGS. 2A and 2B). A result may be a fourier transform of the digitally beamformed radar signals for the beam direction b (or for each of the plurality of beam directions b) $DBF_b(n)$.

The processing of the plurality of radar signals $x_m(k)$ may include at least one Fourier transform 208, for example an N-point Fourier transform, and/or a windowing process 206. The Fourier transform and/or the windowing, may be used for determining a distance and/or a Doppler velocity of the target. See FIGS. 2A and 2B for a visualization.

The Fourier transform and/or the windowing can essentially be performed as one of ordinary skill in the art can appreciate. For example, the windowing may include multiplying each of the samples with a sample-specific complex windowing coefficient w(k). The windowing may in various embodiments be performed before the Fourier transform.

The digitally beamforming 204 of the plurality of further processed radar signals may include multiplying the further processed radar signal of each of the antennas 330 with an antenna and beam specific complex multiplication factor $a_{b,m}$.

In various embodiments, the antenna and beam specific complex multiplication factors $a_{b,m}$ may be provided as a matrix having a number M of the plurality of the antennas as a first dimension and a number D of the plurality of beam directions as a second dimension.

The summing 210 may include coherently summing the plurality of beamformed radar signals from the plurality of antennas 330 per beam direction b.

In various embodiments, the summed beamformed radar signal for the at least one beam direction (b) may be formed according to the formula:

$$DBF_b(n) = \sum_{m=0}^{M-1} a_{b,m} DFT_N(w(k)x_m(k))$$

wherein b is a beam direction index, m is an antenna index, $a_{b,m}$ is antenna and beam specific complex multiplication factor, wherein $$X_m(n) = DFT_N(w_m(k) \cdot x_m(k)) = \sum_{k=0}^{N-1} w_m(k) \cdot x_m(k) \cdot e^{-\frac{i2\pi}{N}kn}$$

wherein k is a sample index, $X_m(n)$ is the discrete Fourier transform (DFT) of a multiplication between a complex window function $w_m(k)$ for an antenna m for the samples k and the radar signals $x_m(k)$ for antenna m for the samples k.

In various embodiments, the beamforming 204 may be executed on-the-fly from the windowed radar signal, which may be stored in a memory 236, e.g. a buffer, before the summing up by performing the complex multiplication with the multiplication factor $a_{b,m}$.

The antenna and beam specific complex multiplication factor $a_{b,m}$ may in various embodiments be determined as $$a_{b,m} = \exp(2\pi j(m \cdot d) \cdot \sin(\theta_b))$$

or as $$a_{b,m} = \exp(2\pi j(m \cdot d) \cdot \sin(\theta_b)) * \text{hann}(m),$$

wherein b=beam index, m=antenna index, and hann( ) may be the Hann window function.

The angle θ that indicates the beam direction that is to receive higher weight in the beamformed radar signal may thus influence the antenna and beam specific complex multiplication factor $a_{b,m}$.

The coherent sum may in various embodiments be determined from:

$$\text{CoherentSum}_b(n) = |DBF_b(n)|^2$$

In various embodiments, the summing may further include non-coherently summing the plurality of beamformed radar signals from the plurality of antennas 330 per beam direction 6. In the exemplary embodiment shown in FIG. 2A, this is performed in the lower branch. The beamforming 216 may be executed on-the-fly from the windowed radar signal, which may be stored in a memory 236, e.g. a buffer, before determining the power and summing up.

The non-coherent sum may in various embodiments be determined from:

$$\text{NonCoherentSum}_b(n) = \sum_{m=0}^{M-1} |c_{b,m} X_m(n)|^2$$

wherein $c_{b,m}$ is an antenna and beam specific multiplication factor for the non-coherent sum, which may be identical to or different from the antenna and beam specific multiplication factor $a_{b,m}$ for the coherent sum.

The antenna and beam specific multiplication factor for the non-coherent sum $c_{b,m}$ may in various embodiments be determined from $$c_{b,m} = \exp(2\pi j(m \cdot d) \cdot \sin(\theta_b))$$

or from $$c_{b,m} = \exp(2\pi j(m \cdot d) \cdot \sin(\theta_b)) * \text{hann}(m),$$

wherein b=beam index, m=antenna index, and hann( ) is the Hann window function. The antenna and beam specific multiplication factor for the non-coherent sum cb,m may be obtained in a similar was as $a_{b,m}$, and/or even as a combination with a window function suitable for the antenna index m.

In various embodiments, the processor 332 may be configured to execute the non-coherent summing and the coherent summing in parallel.

Thus, in various embodiments, one additional complex multiplier $a_{b,m}$ is provided (compared to the example of FIGS. 1C and 1D) that is processed in the portion identified as "MATH2". The additional complex multiplier $a_{b,m}$ may be generated by separating the antenna factor $a_{(b,m)}$ and the windowing w(k).

Using for a comparison of the required memory space the same example as above, (e.g. M=8 antennas, K=1024 samples, and a windowing w(k), real 32-bit, 4 KiB may be required (i.e., only about $\frac{1}{16}^{th}$ of the memory requirement. The antenna factor $a_{(b,m)}$ can only require one byte of storage space per antenna, thus about 64 bytes in total.

In various embodiments, the antenna factor $a_{(b,m)}$ may be updated by the processor 332, e.g. a CPU, in between different beam loops, i.e. between runs with different beam indices; or stored as fixed configuration. In particular, the latter may increase execution speed, but due to the small size of the antenna factor $a_{(b,m)}$, also a speed of updating of the antenna factor $a_{(b,m)}$ may be considerably increased.

In various embodiments, the radar system 300 may further include at least one register (e.g., 64 bits) per antenna 330. The at least one register may for example be included in the portion of the radar system 300 where the non-coherent integration (NCI) is performed, also referred to as the NCI module.

In various embodiments, both the coherently integrated radar signal and the non-coherently integrated radar signal may be provided to the detection block 122. The coherently integrated radar signal and the non-coherently integrated radar signal may be jointly processed for eliminating false detections, in other words, for identifying "true" targets.

Figure 4:
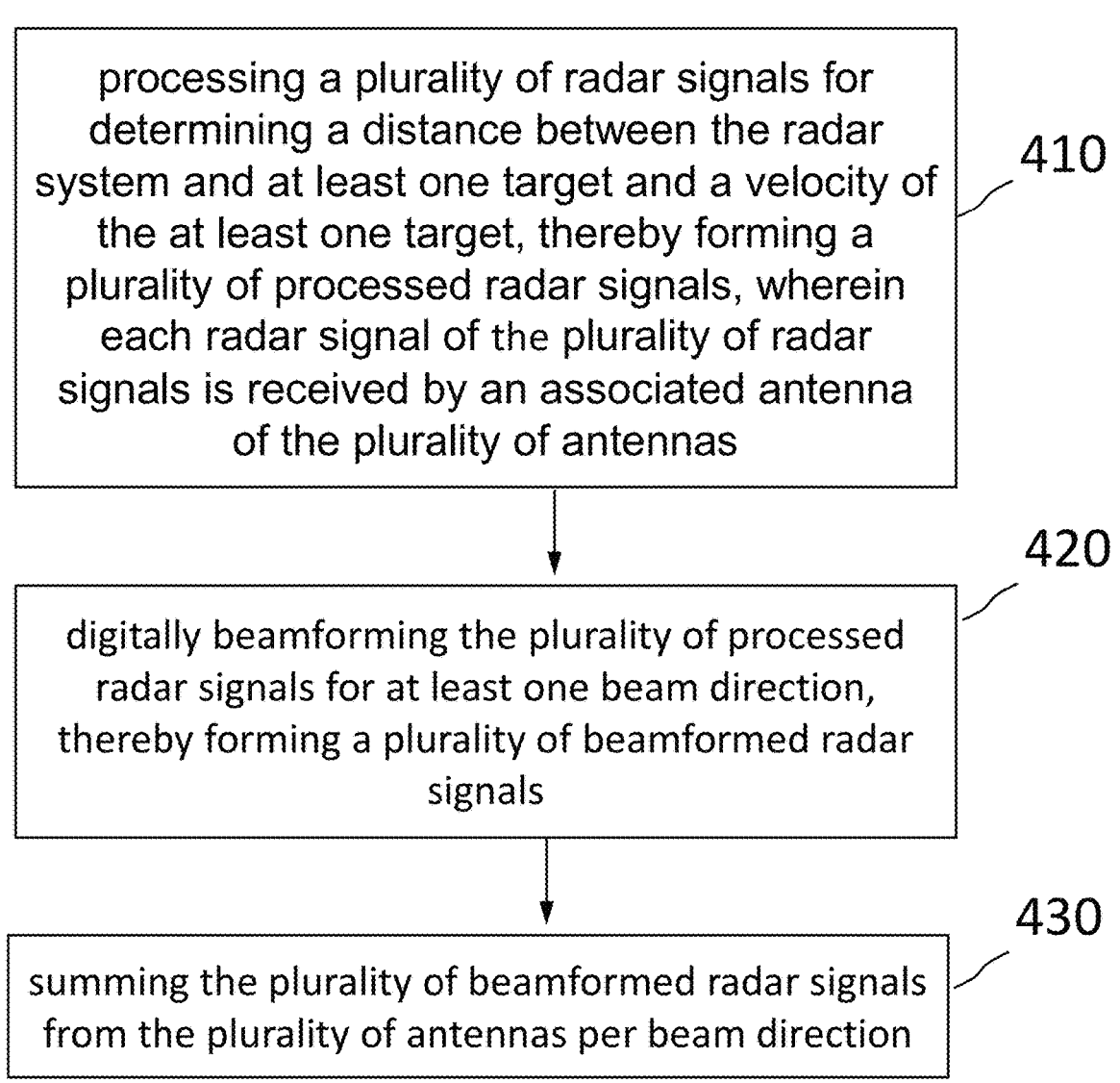
FIG. 4 illustrates a flow diagram of a method of handling radar signals of a radar system in accordance with various embodiments.

FIG. 4 shows a flow diagram 400 of a method of handling radar signals of a radar system in accordance with various embodiments.

The method may include processing a plurality of radar signals for determining a distance between the radar system and at least one target and a velocity of the at least one target, thereby forming a plurality of processed radar signals, wherein each radar signal of the plurality of radar signals is received by an associated antenna of the plurality of antennas (in 410), digitally beamforming the plurality of processed radar signals for at least one beam direction, thereby forming a plurality of beamformed radar signals (in 420), and summing the plurality of beamformed radar signals from the plurality of antennas per beam direction (in 430).

Various examples will be illustrated in the following:

Example 1 is a method of handling radar signals of a radar system having a plurality of antennas. The method may include processing a plurality of radar signals for determining a distance between the radar system and at least one target and a velocity of the at least one target, thereby forming a plurality of processed radar signals, wherein each radar signal of the plurality of radar signals is received by an associated antenna of the plurality of antennas, digitally beamforming the plurality of processed radar signals for at least one beam direction, thereby forming a plurality of beamformed radar signals, and summing the plurality of beamformed radar signals from the plurality of antennas per beam direction.

In Example 2, the subject-matter of Example 1 may optionally include that the processing the plurality of radar signals includes a Fourier transform.

In Example 3, the subject-matter of Example 1 or 2 may optionally include that the processing the plurality of radar signals includes windowing.

In Example 4, the subject-matter of Example 3 may optionally include that each radar signal of the plurality of radar signals comprises a plurality of samples, and that the windowing includes multiplying each of the samples with a sample-specific complex windowing coefficient.

In Example 5, the subject-matter of Examples 2 and 3 may optionally include that the windowing is applied before the Fourier transform.

In Example 6, the subject-matter of any of Examples 1 to 5 may optionally include that the at least one beam direction includes a plurality of beam directions.

In Example 7, the subject-matter of any of Examples 1 to 6 may optionally include that the digitally beamforming the plurality of further processed radar signals includes multiplying the further processed radar signal of each of the antennas with an antenna and beam specific complex multiplication factor.

In Example 8, the subject-matter of Example 7 may optionally include that the antenna and beam specific complex multiplication factors are provided as a matrix having a number of the plurality of the antennas as a first dimension and a number of the plurality of beam directions as a second dimension.

In Example 9, the subject-matter of any of Examples 1 to 8 may optionally include that the summing comprises coherently summing the plurality of beamformed radar signals from the plurality of antennas per beam direction.

In Example 10, the subject-matter of any of Examples 1 to 9 may optionally include that the summed beamformed radar signal for the at least one beam direction (b) is derived from the formula:

$$DBF_b(n) = \sum_{m=0}^{M-1} a_{b,m} X_m(n)$$

wherein b is a beam direction index, m is an antenna index, $a_{b,m}$ is antenna and beam specific complex multiplication factor;
wherein $$X_m(n) = DFT_N(w_m(k) \cdot x_m(k)) = \sum_{k=0}^{N-1} w_m(k) \cdot x_m(k) \cdot e^{-\frac{i2\pi}{N}kn}$$

wherein k is a sample index, $X_m(n)$ is the discrete Fourier transform (DFT) of a multiplication between is a complex window function $w_m(k)$ for an antenna m for the samples k and the radar signals $x_m(k)$ for antenna m for the samples k, and wherein, optionally, $a_{b,m} = \exp(2\pi j(m \cdot d) \cdot \sin(\theta_b))$ or $a_{b,m} = \exp(2\pi j(m \cdot d) \cdot \sin(\theta_b)) * \text{hann}(m)$, wherein b=beam index, m=antenna index, and hann( ) is the Hann window function.

In Example 11, the subject-matter of Example 9 and 10 may optionally include that the coherent sum is:

CoherentSum$_b(n)$=|DBF$_b(n)$|$^2$

In Example 12, the subject-matter of any of Examples 9 to 11 may optionally include that the summing further comprises non-coherently summing the plurality of beamformed radar signals from the plurality of antennas per beam direction.

In Example 13, the subject-matter of Example 12 may optionally include that the non-coherent sum is:

$$NonCoherentSum_b(n) = \sum_{m=0}^{M-1} |c_{b,m} X_m(n)|^2$$

wherein $c_{b,m}$ is an antenna and beam specific multiplication factor for the non-coherent sum, and that, optionally, $$c_{b,m}=\exp(2\pi j(m\cdot d)\cdot\sin(\theta_b))$$

or $$c_{b,m}=\exp(2\pi j(m\cdot d)\cdot\sin(\theta_b))*\text{hann}(m),$$

wherein b=beam index, m=antenna index, and hann( ) is the Hann window function.

In Example 14, the subject-matter of any of Examples 9 to 11 and of Example 12 or 13 may optionally include that the non-coherent summing and the coherent summing are executed in parallel.

In Example 15, the subject-matter of any of Examples 9 to 11 may optionally include that the coherent sum is provided to a target detection algorithm for executing a target detection and/or to a local maxima search algorithm for searching local maxima.

In Example 16, the subject-matter of Example 12 or 13 may optionally include that the non-coherent sum is provided to a target detection algorithm for executing a target detection and/or to a local maxima search algorithm for searching local maxima.

In Example 17, the subject-matter of Example 12 or 13 may optionally include that the target detection and the local maxima search are executed in parallel.

Example 18 is a radar system. The radar system may include a plurality of antennas and at least one processor configured to process a plurality of radar signals for determining a distance between the radar system and at least one target and a velocity of the at least one target, thereby forming a plurality of processed radar signals, wherein each radar signal of the plurality of radar signals is received by an associated antenna of the plurality of antennas, to digitally beamform the plurality of processed radar signals for at least one beam direction, thereby forming a plurality of beamformed radar signals, and to sum the plurality of beamformed radar signals from the plurality of antennas per beam direction.

In Example 19, the subject-matter of Example 18 may optionally include that the processing of the plurality of radar signals includes a Fourier transform.

In Example 20, the subject-matter of Example 18 or 19 may optionally include that the processing of the plurality of radar signals includes windowing.

In Example 21, the subject-matter of Example 20 may optionally include that each radar signal of the plurality of radar signals includes a plurality of samples, and that the windowing includes multiplying each of the samples with a sample-specific complex windowing coefficient.

In Example 22, the subject-matter of Example 20 and 21 may optionally include that the processor is further configured to apply the windowing before the Fourier transform.

In Example 23, the subject-matter of any of Examples 18 to 22 may optionally include that the at least one beam direction includes a plurality of beam directions.

In Example 24, the subject-matter of any of Examples 18 to 23 may optionally include that the digitally beamforming of the plurality of further processed radar signals includes multiplying the further processed radar signal of each of the antennas with an antenna and beam specific complex multiplication factor.

In Example 25, the subject-matter of Example 24 may optionally include that the antenna and beam specific complex multiplication factors are provided as a matrix having a number of the plurality of the antennas as a first dimension and a number of the plurality of beam directions as a second dimension.

In Example 26, the subject-matter of any of Examples 18 to 25 may optionally include that the summing includes coherently summing the plurality of beamformed radar signals from the plurality of antennas per beam direction.

In Example 27, the subject-matter of any of Examples 18 to 26 may optionally include that the processor is further configured to derive the summed beamformed radar signal for the at least one beam direction (b) from the formula:

$$DBF_b(n) = \sum_{m=0}^{M-1} a_{b,m} DFT_N(w(k)x_m(k))$$

wherein b is a beam direction index, m is an antenna index, $a_{b,m}$ is antenna and beam specific complex multiplication factor, wherein $$X_m(n) = DFT_N(w_m(k)\cdot x_m(k)) = \sum_{k=0}^{N-1} w_m(k)\cdot x_m(k)\cdot e^{-\frac{i2\pi}{N}kn}$$

wherein k is a sample index, $X_m(n)$ is the discrete Fourier transform (DFT) of a multiplication between is-a complex window function $w_m(k)$ for an antenna m for the samples k and the radar signals $x_m(k)$ for antenna m for the samples k, and wherein, optionally, $$a_{b,m}=\exp(2\pi j(m\cdot d)\cdot\sin(\theta_b))$$

or $$a_{b,m}=\exp(2\pi j(m\cdot d)\cdot\sin(\theta_b))*\text{hann}(m),$$

wherein b=beam index, m=antenna index, and hann( ) is the Hann window function.

In Example 28, the subject-matter of Example 26 and 27 may optionally include that the coherent sum is:

$$\text{CoherentSum}_b(n)=|DBF_b(n)|^2$$

In Example 29, the subject-matter of Example 27 or 28 may optionally include that the summing further includes non-coherently summing the plurality of beamformed radar signals from the plurality of antennas per beam direction.

In Example 30, the subject-matter of Example 29 may optionally include that the non-coherent sum is:

$$\text{NonCoherentSum}_b(n) = \sum_{m=0}^{M-1} |c_{b,m} X_m(n)|^2$$

wherein $c_{b,m}$ is an antenna and beam specific multiplication factor for the non-coherent sum, and wherein, optionally, $$c_{b,m}=\exp(2\pi j(m\cdot d)\cdot\sin(\theta_b))$$

or $$c_{b,m}=\exp(2\pi j(m\cdot d)\cdot\sin(\theta_b))*\text{hann}(m),$$

wherein b=beam index, m=antenna index, and hann( ) is the Hann window function.

In Example 30, the subject-matter of Example 26 to 28 and of Example 29 or 30 may optionally include that the processor is further configured to execute the non-coherent summing and the coherent summing in parallel.

While reference has been made to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A method of handling radar signals of a radar system comprising a plurality of antennas, the method comprising:
processing a plurality of radar signals for determining a distance between the radar system and at least one target and a velocity of the at least one target, thereby forming a plurality of processed radar signals, wherein each radar signal of the plurality of radar signals is received by an associated antenna of the plurality of antennas;
digitally beamforming the plurality of processed radar signals for a plurality of beam directions, thereby forming a plurality of beamformed radar signals; and
summing the plurality of beamformed radar signals from the plurality of antennas according to beam direction, wherein the summing comprises coherently summing the plurality of beamformed radar signals from the plurality of antennas per beam direction.

2. The method of claim 1, wherein the processing the plurality of radar signals comprises a Fourier transform.

3. The method of claim 2, wherein the processing the plurality of radar signals comprises windowing.

4. The method of claim 3, wherein:
each radar signal of the plurality of radar signals comprises a plurality of samples; and
the windowing comprises multiplying each of the samples with a sample-specific complex windowing coefficient $w(k)$ where k is a sample index for a specific sample.

5. The method of claim 3, wherein the windowing is applied before the Fourier transform.

6. The method of claim 1, wherein the digitally beamforming the plurality of processed radar signals includes multiplying the processed radar signal of each of the antennas with an antenna-and-beam-specific complex multiplication factor.

7. The method of claim 6, wherein the antenna-and-beam-specific complex multiplication factors are provided as a matrix having a number of the plurality of antennas as a first dimension and a number of the plurality of beam directions as a second dimension.

8. The method of claim 1, wherein the coherent sum is provided to a target detection algorithm for executing a target detection and/or to a local maxima search algorithm for searching local maxima.

9. The method of claim 1, wherein the summed beamformed radar signal for the plurality of beam directions (b) is derived from the formula:

$$DBF_b(n) = \sum_{m=0}^{M-1} a_{b,m} X_m(n)$$

wherein b is a beam direction index, m is an antenna index, $a_{b,m}$ is an antenna-and-beam-specific complex multiplication factor;
wherein $$X_m(n) = DFT_N(w_m(k) \cdot x_m(k)) = \sum_{k=0}^{N-1} w_m(k) \cdot x_m(k) \cdot e^{-\frac{i2\pi}{N}kn}$$

wherein k is a sample index, $X_m(n)$ is the discrete Fourier transform (DFT) of a multiplication between a complex window function $w_m(k)$ for an antenna m for the samples k and the radar signals $x_m(k)$ for antenna m for the samples k; and
wherein, optionally, $$a_{b,m} = \exp(2\pi j(m \cdot d) \cdot \sin(\theta_b))$$

or $$a_{b,m} = \exp(2\pi j(m \cdot d) \cdot \sin(\theta_b)) * \text{hann}(m),$$

wherein b=beam index, m=antenna index, and hann( ) is the Hann window function.

10. The method of claim 9, wherein the coherent sum is:

$$\text{CoherentSum}_b(n) = |DBF_6(n)|^2$$

11. The method of claim 1, wherein the summing further comprises non-coherently summing the plurality of beamformed radar signals from the plurality of antennas per beam direction.

12. The method of claim 11, wherein the non-coherent sum is provided to a target detection algorithm for executing a target detection and/or to a local maxima search algorithm for searching local maxima.

13. The method of claim 12, wherein the target detection algorithm and the local maxima search algorithm are executed in parallel.

14. The method of claim 11, wherein the non-coherent sum is:

$$\text{NonCoherentSum}_b(n) = \sum_{m=0}^{M-1} |c_{b,m} X_m(n)|^2$$

wherein $c_{b,m}$ is an antenna-and-beam-specific multiplication factor for the non-coherent sum; and
wherein, optionally, $$c_{b,m} = \exp(2\pi j(m \cdot d) \cdot \sin(\theta_b))$$

or $$c_{b,m} = \exp(2\pi j(m \cdot d) \cdot \sin(\theta_b)) * \text{hann}(m),$$

wherein b=beam index, m=antenna index, and hann( ) is the Hann window function.

15. The method of claim 11, wherein the non-coherent summing and the coherent summing are executed in parallel.

16. A radar system, comprising:
a plurality of antennas; and
at least one processor configured to:
process a plurality of radar signals for determining a distance between the radar system and at least one target and a velocity of the at least one target, thereby forming a plurality of processed radar signals, wherein each radar signal of the plurality of radar signals is received by an associated antenna of the plurality of antennas;
digitally beamform the plurality of processed radar signals for a plurality of beam directions, thereby forming a plurality of beamformed radar signals; and sum the plurality of beamformed radar signals from the plurality of antennas per beam direction, wherein the summing comprises coherently summing the plurality of beamformed radar signals from the plurality of antennas per beam direction.

17. The radar system of claim 16, wherein the processing of the plurality of radar signals comprises a Fourier transform.

18. The radar system of claim 17, wherein the processing of the plurality of radar signals comprises windowing.

\* \* \* \* \*